US009402228B2

(12) United States Patent
Gupta

(10) Patent No.: US 9,402,228 B2
(45) Date of Patent: *Jul. 26, 2016

(54) MECHANISMS FOR ROAMING BETWEEN 3GPP OPERATORS AND WLAN SERVICE PROVIDERS

(71) Applicant: Intel Corporation, Santa Clara, CA (US)

(72) Inventor: Vivek Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/794,701

(22) Filed: Jul. 8, 2015

(65) Prior Publication Data

US 2015/0312747 A1 Oct. 29, 2015

Related U.S. Application Data

(63) Continuation of application No. 14/334,097, filed on Jul. 17, 2014, now Pat. No. 9,113,402, which is a continuation of application No. 13/665,761, filed on Oct. 31, 2012, now Pat. No. 8,817,707.

(60) Provisional application No. 61/674,274, filed on Jul. 20, 2012.

(51) Int. Cl.
*H04W 48/16* (2009.01)
*H04W 8/08* (2009.01)
(Continued)

(52) U.S. Cl.
CPC ............... *H04W 48/16* (2013.01); *H04B 7/024* (2013.01); *H04W 8/02* (2013.01); *H04W 8/085* (2013.01);
(Continued)

(58) Field of Classification Search
None
See application file for complete search history.

(56) References Cited

U.S. PATENT DOCUMENTS

2004/0181692 A1* 9/2004 Wild .................... H04W 48/14
726/4
2006/0187892 A1* 8/2006 Zhang .................. H04W 48/18
370/338

(Continued)

OTHER PUBLICATIONS

IEEE Standards Association, "Part 11: Wireless LAN Medium Access Control (MAC) and Physical Layer (PHY) Specifications, Amendment 9: Interworking with External Networks," IEEE Computer Society, LAN/MAN Standards Committee, IEEE Standard for Information technology- Telecommunications and information exchange between systems—Local and metropolitan area networks—Specific requirements, IEEE Std 802.11u, Feb. 25, 2011, 208 pages, New York, New York.

(Continued)

*Primary Examiner* — Hong Cho
(74) *Attorney, Agent, or Firm* — Schwabe, Williamson & Wyatt, P.C.

(57) ABSTRACT

Embodiments describe methods, apparatuses and logic for a user equipment (UE) to connect to an access point (AP) in a wireless local area network (WLAN) based on credentials from a UE's home third generation partnership project (3GPP) network. In some embodiments, the UE may receive selection policy parameters from the WLAN including a network access identifier (NAI) realm. The UE may also receive selection policy parameters from the 3GPP network. The UE may compare the selection policy parameters of the WLAN with the selection policy parameters of the 3GPP network and discover roaming relationships between service providers and the relative priorities of different networks, and create a network list based on the comparison. The UE may then associate with an AP of the WLAN based on the prioritized network list.

20 Claims, 4 Drawing Sheets

(51) Int. Cl.
    H04W 48/00      (2009.01)
    H04W 40/20      (2009.01)
    H04W 36/34      (2009.01)
    H04B 7/02       (2006.01)
    H04W 60/00      (2009.01)
    H04W 36/00      (2009.01)
    H04W 8/02       (2009.01)
    H04W 48/18      (2009.01)
    H04W 36/08      (2009.01)
    H04W 80/04      (2009.01)
    H04W 84/12      (2009.01)

(52) U.S. Cl.
    CPC .......... *H04W 36/0016* (2013.01); *H04W 36/34* (2013.01); *H04W 40/20* (2013.01); *H04W 48/17* (2013.01); *H04W 48/18* (2013.01); *H04W 60/00* (2013.01); *H04W 36/08* (2013.01); *H04W 80/04* (2013.01); *H04W 84/12* (2013.01)

(56) References Cited

U.S. PATENT DOCUMENTS

| | | | | |
|---|---|---|---|---|
| 2006/0212700 | A1* | 9/2006 | Zhang | H04L 63/08 713/167 |
| 2006/0217147 | A1* | 9/2006 | Olvera-Hernandez | H04W 36/005 455/552.1 |
| 2007/0036120 | A1* | 2/2007 | Zhang | H04L 12/14 370/338 |
| 2007/0070958 | A1* | 3/2007 | Rinne | H04W 12/06 370/338 |
| 2009/0196265 | A1* | 8/2009 | Mariblanca Nieves | H04W 8/065 370/338 |
| 2010/0169954 | A1* | 7/2010 | Ogura | H04L 63/08 726/4 |
| 2011/0072101 | A1* | 3/2011 | Forssell | H04W 48/18 709/206 |
| 2011/0075608 | A1* | 3/2011 | Chai | H04W 48/18 370/328 |
| 2012/0243436 | A1* | 9/2012 | Hind | H04W 48/18 370/254 |
| 2013/0121325 | A1* | 5/2013 | McCann | H04W 48/12 370/338 |
| 2013/0272287 | A1* | 10/2013 | Xiang | H04W 48/16 370/338 |

OTHER PUBLICATIONS

3GPP, "3rd Generation Partnership Project; Technical Specification Group Services and System Aspects; WLAN Network Selection for 3GPP Terminals; Stage 2 (Release 12)," Lte, 3GPP TR 23.865 V0.2.0, Jul. 23, 2012, 9 pages.

Orlandi et al., "WI-FI Roaming Building on ANDSF and Hotspot2.0," Alcatel-Lucent White Paper in Collaboration with BT, 45 pages, website: http://www.alcatel-lucent.com, Jul. 2014.

* cited by examiner

MECHANISMS FOR ROAMING BETWEEN 3GPP OPERATORS AND WLAN SERVICE PROVIDERS

CROSS REFERENCE TO RELATED APPLICATIONS

The present application is a continuation of U.S. patent application Ser. No. 14/334,097, filed Jul. 17, 2014, entitled "MECHANISMS FOR ROAMING BETWEEN 3GPP OPERATORS AND WLAN SERVICE PROVIDERS," which is a continuation of U.S. patent application Ser. No. 13/665,761, filed Oct. 31, 2012, entitled "MECHANISMS FOR ROAMING BETWEEN 3GPP OPERATORS AND WLAN SERVICE PROVIDERS," which claims priority to U.S. Provisional Patent Application No. 61/674,274, filed Jul. 20, 2012, entitled "Advanced Wireless Communication Systems and Techniques," the entire disclosures of which are hereby incorporated by reference in their entireties.

FIELD

Embodiments relate to systems, methods and instructions for a third generation partnership project (3GPP) user equipment (UE) to leverage wireless local area network (WLAN) roaming parameters when leaving a 3GPP network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Current 3GPP specifications may use service set identifiers (SSIDs) or homogenous extended SSIDs (HESSIDs) to identify a WLAN to which an access point (AP) belongs. SSIDs and HESSIDs will be collectively referred to herein as SSIDs. Specifically, the use of SSIDs may occur during a network discovery and selection process when a UE on the 3GPP network is attempting to connect with a WLAN.

However, SSIDs may not be guaranteed to be unique. Additionally, if a UE is bound by rules of a roaming agreement between the 3GPP network and one or more WLAN service providers, the UE may need to have knowledge of all of the SSIDs of all of the service provider partners of the 3GPP network. Management of the SSIDs can become difficult because each of the WLAN service providers may have multiple SSIDs. Additionally, WLAN service providers may occasionally add or remove an SSID. Another difficulty with managing SSIDs is that new roaming agreements may be put in place, or existing roaming agreements may be terminated, making it difficult to manage the SSIDs of all of the WLAN service providers that the 3GPP network operator has a roaming agreement with. Finally, not all SSIDs may be broadcast over the air, making it difficult to discover WLAN roaming relationships and public land mobile networks (PLMNs) supported by the un-broadcast SSIDs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Apparatuses, methods, and storage media are described herein for allowing a UE to query one or more WLANs according to a WLAN query, for example using protocols such as an access network query protocol (ANQP). The UE may also query the UE's home network according to a 3GPP query or based on pre-provisioned subscription information on the UE. One purpose of the query is to identify one or more WLAN network selection policy parameters, for example data related to a roaming consortium, organizationally unique identifiers (OUIs), or network access identifier (NAI) realms, signifying an existing roaming agreement between the UE's home network and the WLAN. The UE can use the data related to the additional roaming identifiers to identify and connect to WLAN APs that have an agreement with the UE's home 3GPP network service provider.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
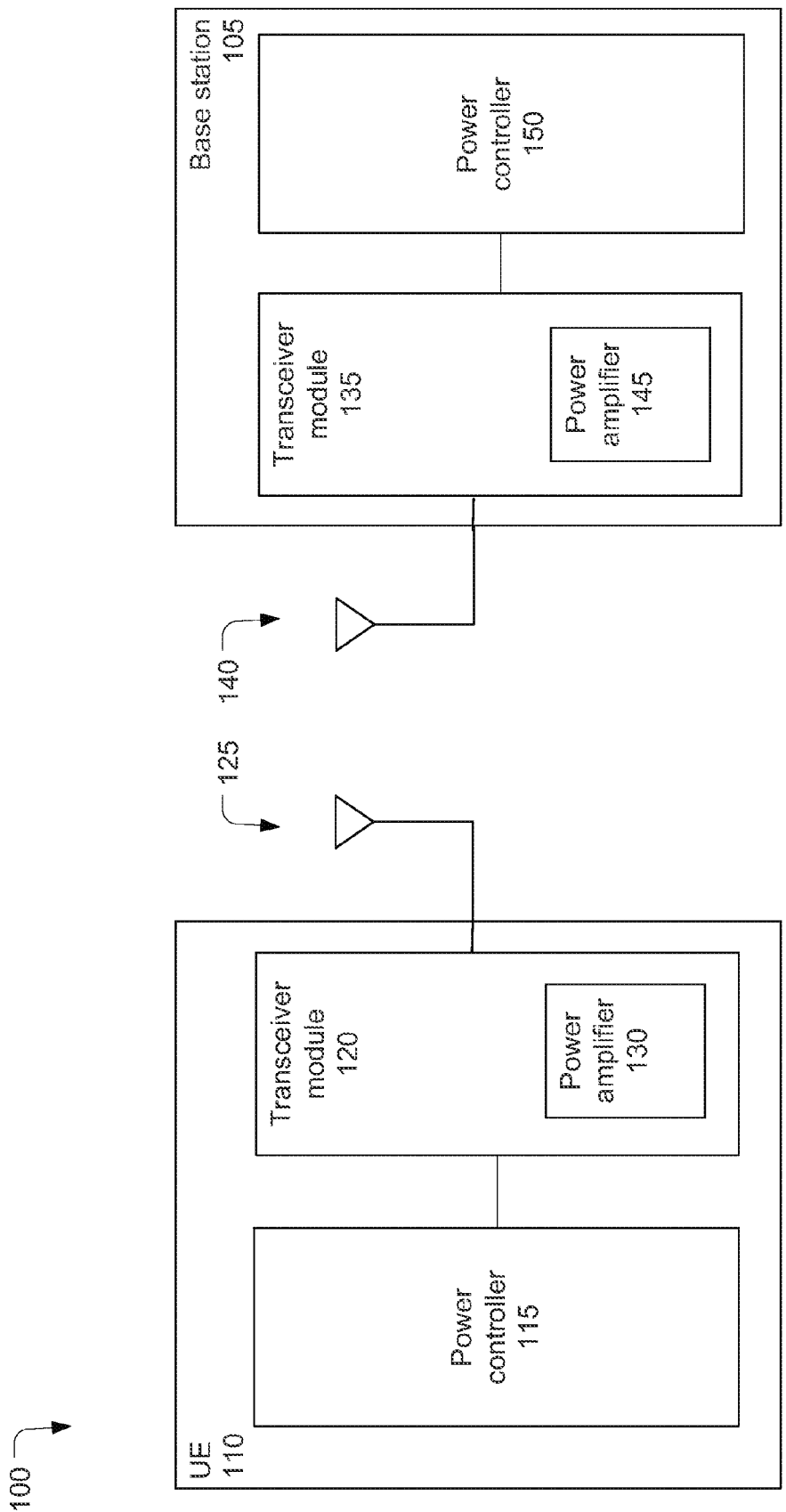
FIG. 1 schematically illustrates a high-level example of a network system comprising a UE and a base station, in accordance with various embodiments.

FIG. 1 schematically illustrates a two-entity wireless communication network 100 in accordance with various embodiments. Wireless communication network 100 (hereinafter "network 100") may be a radio access network of a 3GPP long term evolution (LTE) network such as an evolved universal terrestrial radio access network (E-UTRAN). In other embodiments, the network 100 may be a WLAN radio access network conforming to one or more institute of electrical and electronics engineers specifications such as the institute of electrical and electronics engineers (IEEE) 802.11 specification. The network 100 may include a base station 105, configured to wirelessly communicate with a UE 110. The base station 105 may be a 3GPP eNodeB (eNB) or a WLAN access point (AP). The UE 110 may be configured to communicate with one or more of a 3GPP eNB or a WLAN AP either one at a time or substantially in parallel with one another.

As shown in FIG. 1, the UE 110 may include a transceiver module 120. The transceiver module 120 may be further coupled with an antenna 125 of the UE 110 for communicating wirelessly with other components of the network 100, e.g., base station 105. The antenna 125 may be powered by a power amplifier 130 which may be a component of the transceiver module 120, as shown in FIG. 1, or may be a separate component of the UE 110. In one embodiment, the power amplifier 130 provides the power for all transmissions on the antenna 125. In other embodiments, there may be multiple power amplifiers, multiple antennas, or both, on the UE 110.

Similarly, the base station 105 may include a transceiver module 135 coupled with an antenna 140 of the base station 105 for communicating wirelessly with a network component such as the UE 110. The base station 105 may further include a power amplifier 145 coupled with the transceiver module 130 and a power controller 150. In one embodiment, the power amplifier 145 provides the power for all transmissions on the antenna 140. In other embodiments, there may be multiple power amplifiers or multiple antennas, or both on the base station 105.

Figure 2:
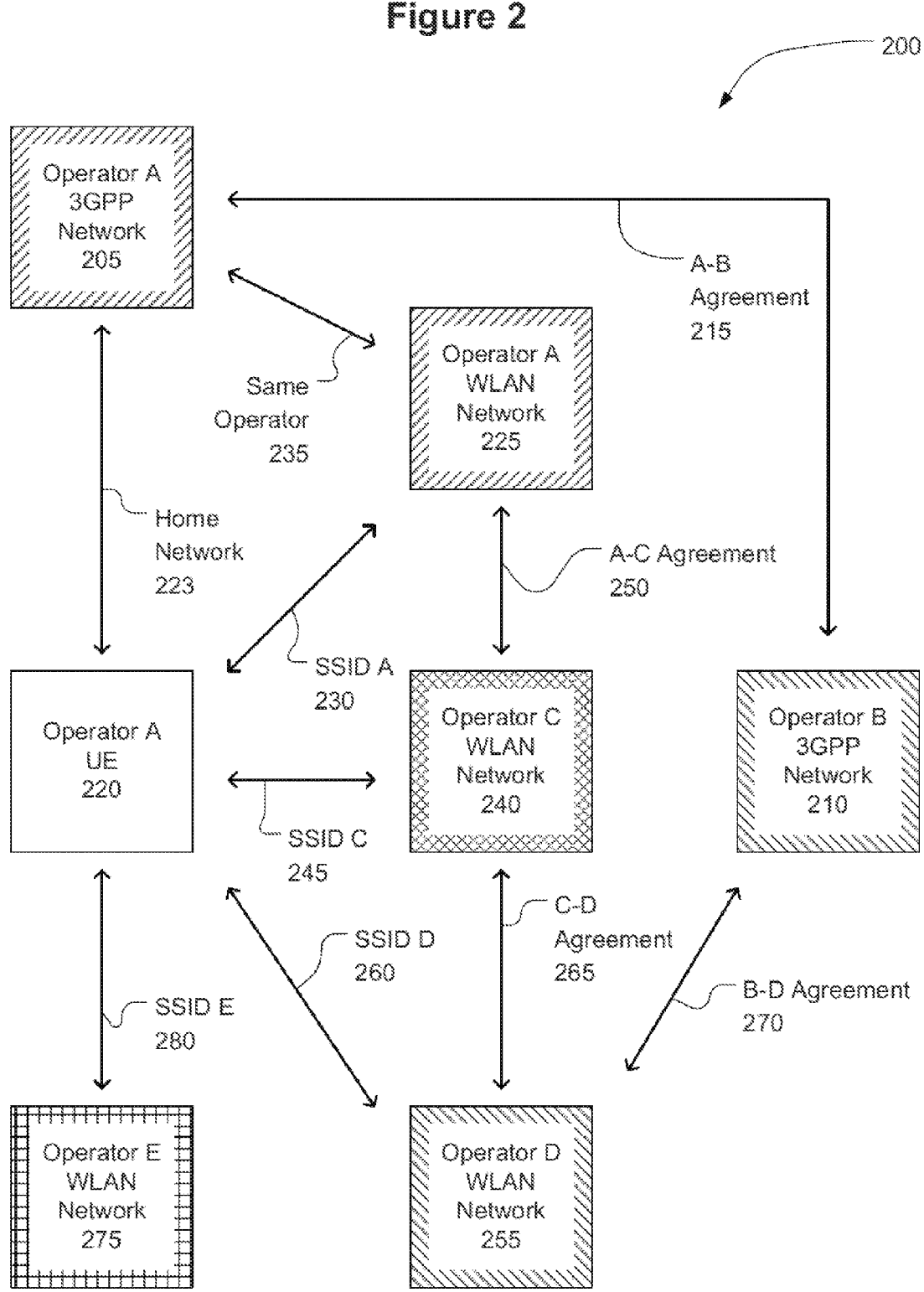
FIG. 2 illustrates an exemplary multi-operator network, in accordance with various embodiments.

FIG. 2 depicts an exemplary network 200 with multiple entities. The description herein will refer to network 200 as a network, but it will be understood that in certain embodiments network 200 may be more accurately referred to as a collection of heterogeneous networks. The network may comprise 3GPP Network 205 owned by Operator A and a 3GPP Network 210 owned by Operator B. The network 200 may include a UE 220 which may have an agreement 223 with Operator A to use Operator A as the UE's home network. In some embodiments, the 3GPP network 205 may be the home public land mobile network (HPLMN) of the UE 220. In other embodiments, the 3GPP network 205 may be the visited public land mobile network (VPLMN) of the UE 220. Throughout this specification, the UE's "home" 3GPP network may refer to one or the other of either the HPLMN or the VPLMN.

The 3GPP Network 205 of Operator A and the 3GPP Network 210 of Operator B may have a roaming agreement 215 which allows the UE 220 to roam on to the 3GPP Network 210 of Operator B. In some embodiments the UE 220 of Operator A may be the UE 110 of FIG. 1. Additionally, the UE 220 may connect to the 3GPP Network 205, 210 via an eNB such as the base station 105 of FIG. 1.

In some embodiments, Network Operator A may additionally operate a WLAN Network 225 broadcasting an SSID A 230 via an AP such as base station 105. The 3GPP Network 205 of Operator A may be in communication 235 with the WLAN Network 225 of Operator A because they are both operated by Operator A.

The network 200 may further comprise a WLAN network 240 operated by operator C and broadcasting a SSID C 245 via an AP such as base station 105. Operator A and Operator C may have a roaming agreement 250 between them specifying the conditions for a UE on Operator A's home network to connect to Operator C's network. In some embodiments, the agreement 250 may be a specific WLAN based agreement allowing roaming between the WLAN Network 225 of Operator A and the WLAN Network 240 of Operator C. In other embodiments, not shown in FIG. 2, the Agreement between Operator A and Operator C may be a 3GPP—WLAN based Agreement allowing a UE to roam from Operator A's 3GPP Network 205 to the WLAN Network 240 of Operator C. In both embodiments, Operator C may be considered to have a direct roaming relationship with Operator A.

The network 200 may further comprise a WLAN network 255 operated by Operator D and broadcasting SSID D 260 via an AP such as base station 105. Operator C and Operator D may have a roaming agreement 265 between them such that a UE on the WLAN Network 240 of Operator C is allowed to roam onto the WLAN Network 255 of Operator D. In one embodiment the agreement 265 may be limited to WLAN to WLAN roaming, while in other embodiments the agreement 265 may more broadly define the parameters of network to network roaming between Operators C and D.

Operator D may additionally have an agreement 270 with Operator B such that a UE on Operator B's 3GPP network 210 is able to roam onto Operator D's WLAN Network 255. In some embodiments of the network 200 both the C-D agreement 265 and the B-D agreement 270 may exist, while in other embodiments Operator D only has an agreement with either Operator B or Operator C. In either embodiment, Operators A and D may be considered to have an indirect roaming relationship between them. The roaming relationship is considered indirect because a UE having an agreement 223 with Operator A may access Operator D's WLAN Network 255 even though Operator A does not have a direct agreement with Operator D.

The network may further comprise a WLAN Network 275 owned by Operator E and broadcasting SSID E 280. Operator E may not have any agreements with Operators A-D. Therefore, Operators A and D may be considered to have no roaming relationship.

There are additional network selection policy parameters that may be used in WLAN-WLAN network interoperation in conjunction with, or as an alternative to, SSIDs. One such identifier is a roaming consortium identifier which may identify a group of network service providers with roaming agreements. Specifically, a roaming consortium identifier may specifically identify a home network operator which may be capable of allocating and verifying a UE's security credentials to an AP of a WLAN. In some embodiments where the WLAN concept of roaming consortiums are used in 3GPP networks, 3GPP specifications such as Technical Specification 24.312 v11.4.0 (2012-09), which describe Access Network Discovery and Selection Function (ANDSF), may require amendment to include a specific roaming consortium leaf node identifier, for example in ANDSF Mobile Object (MO), which may be called a RoamingConsortiumIdentifier. The RoamingConsortiumIdentifier node may act as a placeholder for identification of Roaming Consortiums of which a WLAN network operator is a part.

An additional identifier is an OUI. An OUI may be used to identify a WLAN which is lacking a PLMN identifier. In some embodiments where the WLAN concept of OUIs are used in 3GPP networks, 3GPP specifications may require amendment to include a specific leaf node identifier, which may be called an OUI leaf node. The OUI leaf node may be the organization identifier of the UE's home service provider.

A third identifier which may be used is an NAI realm. The NAI realm may be used to identify a WLAN corresponding to a service provider whose networks or services are accessible via an AP of the WLAN. As an example, an NAI realm for company "XYZ" may be "XYZ.com." A UE of a WLAN or 3GPP operator which has a subscription agreement with company XYZ may recognize the NAI realm XYZ.com and be able to connect to the WLAN. In some embodiments where the WLAN concept of NAI realms are used in 3GPP networks, 3GPP specifications may require amendment to include a specific NAI realm leaf node identifier, which may be called a Realm leaf node. The Realm leaf node may identify the realm associated with the WLAN network or the UE's home network. A UE may determine if it has a roaming agreement with a WLAN network through the use of the Realm leaf node. Network selection policies may be specified in 3GPP specifications based on use of Realms. One embodiment of such a network selection policy may be, for example, "WLANs that interwork with Realm=RoamingPartnerX.com have the highest access priority." The UE may use Realms and/or OUIs as an alternative to the use of SSID to identify and prioritize the discovered WLAN access networks.

In some embodiments the Realm leaf node may be used in an NAI home realm query which may be used by a requesting UE to determine whether the NAI realms for which it has security credentials, for example through its home network, are realms corresponding to operators or other entities whose networks or services are accessible via the WLAN network. An NAI home realm query may include, for example only the NAI home realm names for which the UE has credentials.

In response to the NAI home realm query, a responding AP of the WLAN may return an NAI realm list, for example formatted according to IEEE 802.11u-2011 in one embodiment. The NAI realm list may include only NAI realms that exactly match the realms contained in the NAI home realm query. The NAI realm list may contain one or more NAI realm data fields having one or more matching realms contained within an NAI realm subfield. If the responding WLAN AP has no matching NAI realm subfields, then the NAI realm list may be returned with the NAI realm count set to zero.

In some embodiments, a root NAI format used by the WLAN UE when it attempts to authenticate directly to HPLMN. In other embodiments, a decorated NAI format is used by the WLAN UE when it attempts to authenticate to HPLMN via VPLMN. In yet other embodiments, an alternative NAI format used by the WLAN UE when it attempts to obtain a list of available PLMNs during a manual selection procedure.

In one embodiment of the present disclosure, the additional network identifiers may be used for 3GPP to WLAN network roaming. In this embodiment, it may be beneficial to enable an ANDSF in the Evolved Packet Core (EPC) of a 3GPP network to identify preferred WLAN networks by one or more of the selection policy parameters such as a roaming consortium, an OUI or an NAI realm. In certain embodiments, the interworking wireless local area network (I-WLAN) interworking MO (IWK MO) as defined, for example, in 3GPP Technical Specification 24.235 v11.1.0 (2012-06) may also be enabled to provide the additional parameters/information during WLAN PLMN selection.

As an example of a roaming consortium including 3GPP networks is shown in FIG. 2. For example, Operators A and C may belong to Roaming Consortium X, as indicated by their respective hashing. In addition, Operators B, C and D may belong to Roaming Consortium Y, as indicated by their respective hashing. The cross-hash hashing of Operator C is due to its belonging to both Roaming Consortiums X and Y. As described above, the Operators in a given Roaming Consortium may have a common roaming agreement such that a UE which has an agreement with one operator in the consortium may roam onto other networks in the same consortium.

Figure 3:
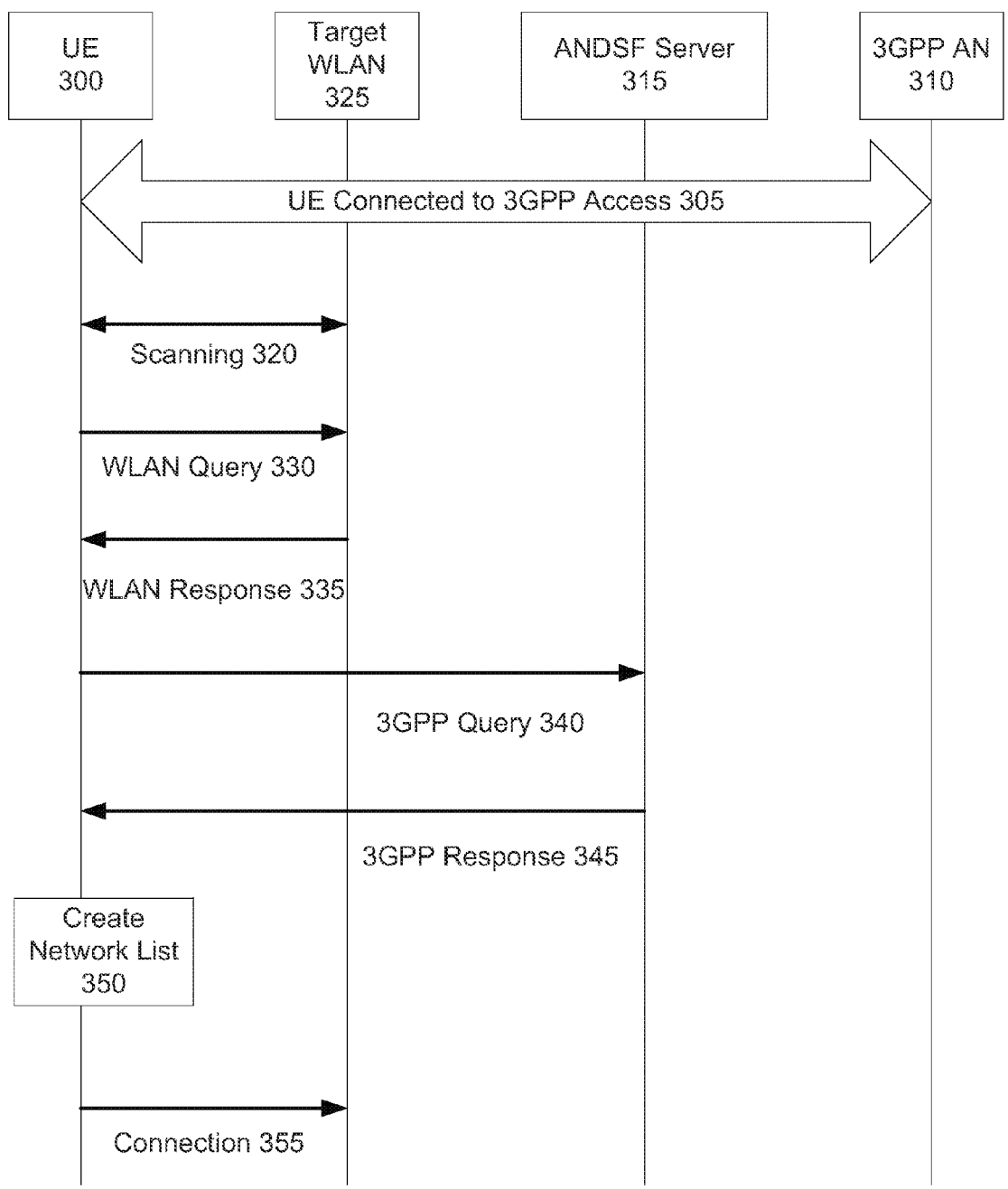
FIG. 3 illustrates exemplary connection procedure, in accordance with various embodiments.

FIG. 3 depicts exemplary logic that may be used in one embodiment to make use of the selection policy parameters when roaming from a 3GPP network to a WLAN network. In this embodiment, the UE 300 may have an initial connection 305 to a 3GPP Access Network (AN) 310 such as an LTE network. The UE 300 may have access to an ANDSF server 315 of the current network.

The UE 300 may perform passive or active scanning 320 and discover one or more available target WLAN networks. Specifically, the scanning 320 may result in an SSID of a target WLAN 325. It will be understood, particularly with reference to FIG. 2, that multiple WLAN networks may be discovered, and the following process may be repeated either in parallel or sequentially with each of them. However, the following description will refer to a single target WLAN 325 for clarity. In some embodiments, the UE 300 may gather additional information from a beacon signal or some other signal, though gathering this additional information may take an extended period of time if there are a large number of WLAN networks in the vicinity. In some embodiments the beacon signal may include OUI data. In some embodiments this additional information may be necessary because it may be difficult for the UE 300 to discover roaming relationships between the UE's home network, e.g., 3GPP AN 310, and the target WLAN 325 based only on an identified SSID.

The UE 300 may then send a WLAN query 330 to the target WLAN 325. In one embodiment, the WLAN query 330 may be an ANQP generic advertisement service (GAS) query such as the ANQP GAS query defined in IEEE 802.11u-2011. In the query, the UE may request selection policy parameters such as the list of roaming consortiums of which the target WLAN 325 is a part, the OUI of the target WLAN 325 or the NAI realm of the target WLAN 325.

The target WLAN 325 may then send a WLAN response 335 to the UE 300. The WLAN response 335 may correspond to an ANQP response message. The WLAN response 335 may include the requested selection policy parameters such as roaming consortium information, OUI information, or NAI realm information of the target WLAN 325. If the UE 300 queries multiple WLANs and receives responses from the multiple WLANs, the queries and responses may occur at substantially the same time or they may occur asynchronously with one another. For example the UE 300 may query all of the target WLANs at the same time, or it may query a first WLAN, and then a second WLAN, etc. In some embodiments the UE 300 may wait for a response from the first WLAN before it queries a second WLAN.

The UE 300 may then send 3GPP query 340 to the ANDSF Server 315 of the UE's home network for selection policy parameters related to one or more of the roaming consortiums, NAI realms, or OUIs that are supported by the UE's home network. The ANDSF Server 315 may send 3GPP response 345 to the 3GPP query 340. In one embodiment, the 3GPP query 340 may include the selection policy parameters related to the roaming consortium, NAI realms, or OUIs received from the target WLAN 325. For example, the UE 300 may query the ANDSF server 315 to verify that the UE's home network is in the same roaming consortium as the target WLAN 325. Alternatively, the UE 300 may verify that the UE is able to roam to a target WLAN 325 identified by a specific NAI realm or OUI. In another embodiment, the UE 300 may simply query for any roaming consortiums, NAI realms or OUIs that the UE's home network has a roaming agreement with. The UE 300 may be operable to compare the information received from the ANDSF Server 315 and the target WLAN 325 to determine whether the UE is able to roam to the target WLAN 325.

Based on the WLAN response 335 and the 3GPP response 345, the UE 300 may create a network list 350. The network list may be based on one or more of the roaming consortiums, NAI realms, or OUIs that are supported by the UE's home network. Additionally, the network list may be based on whether the UE's home network has a direct roaming relationship, indirect roaming relation, or no roaming relationship with the target WLAN 325.

As an example, the UE 300 may evaluate the target WLAN 325 and the information received in the 3GPP response 345 from the ANDSF server 315 to determine whether the UE's home network and the target WLAN 325 belong to the same roaming consortium, which would indicate that a roaming relationship exists between the target WLAN 325 and the UE's home network.

Similarly, the UE 300 may evaluate the realm list information to determine whether a relationship exists between the UE's home network and the target WLAN 325. For example, the UE 300 may compare the realm of the UE's home network with the realm of the target WLAN 325. If the realm of the target WLAN 325 is included in the list of realms supported by the UE's home network, then the UE 300 may establish that the target WLAN 325 is a preferred partner of the UE's home network. A similar analysis may be performed for the OUI information received from the target WLAN 325 and the ANDSF server 315.

Based on information such as the roaming relationships identified through the selection policy parameters such as the roaming consortium, NAI realm and OUI data, the UE may establish a relative priority among the different WLANs. The network selection policy parameters may also include data related to whether the UE's home network has a direct roaming relationship, indirect roaming relation, or no roaming relationship with another WLAN. This data may also be used to establish a relative priority among the different WLANs. In some embodiments, a direct roaming relationship between the UE's home network and the target WLAN may be ranked with a higher priority than an indirect roaming relationship between the UE's home network and the target WLAN. Additionally, the indirect roaming relationship may be ranked with a higher priority than no relationship between the UE's home network and the target WLAN. Based on this prioritization, the UE 300 may select the highest ranked WLAN, for example the target WLAN 325, and connect 355 to the WLAN.

Figure 4:
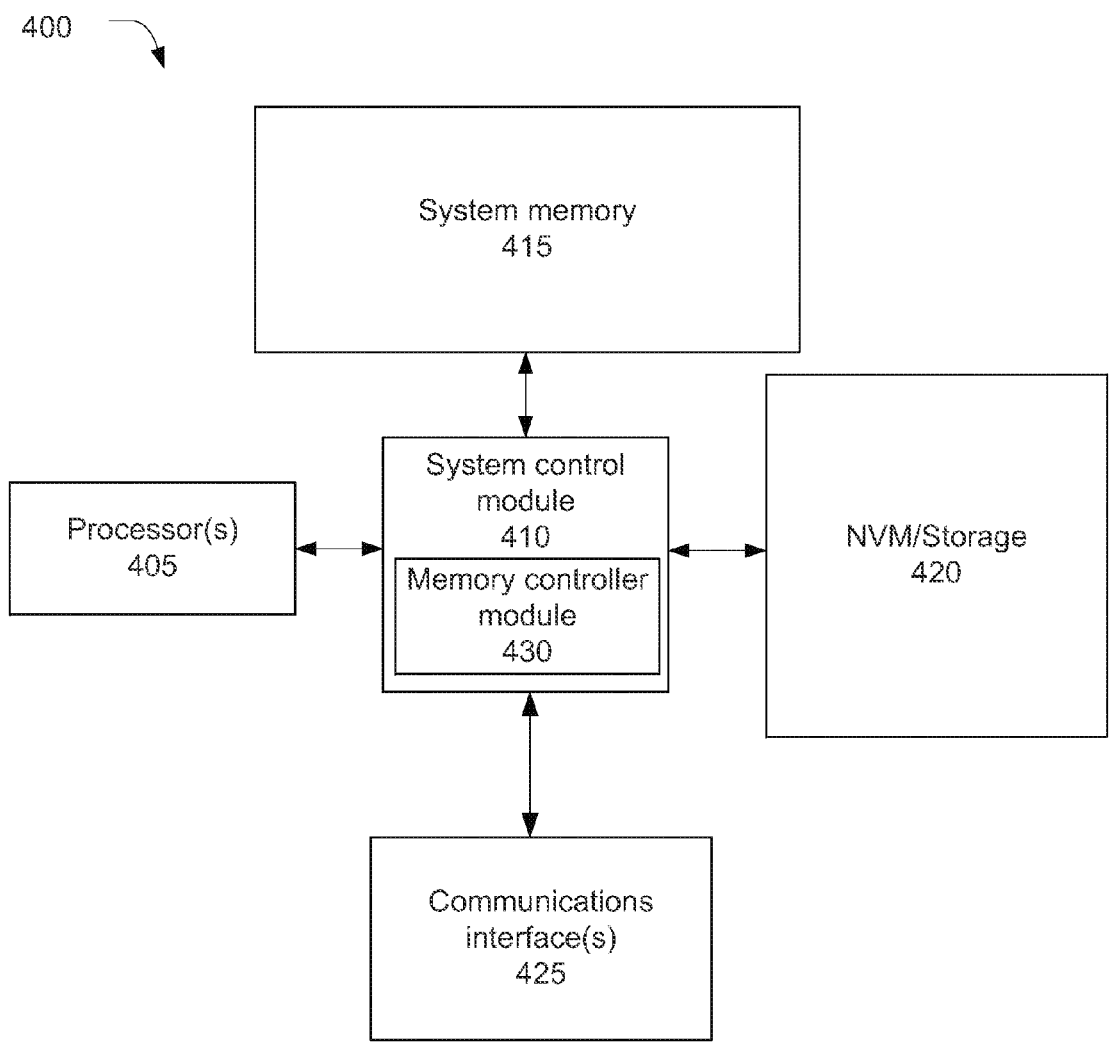
FIG. 4 schematically illustrates an example system that may be used to practice various embodiments described herein.

Embodiments of the present disclosure may be implemented into a system using any suitable hardware and/or software to configure as desired. FIG. 4 schematically illustrates an example system 400 that may be used to practice various embodiments described herein. FIG. 4 illustrates, for one embodiment, an example system 400 having one or more processor(s) 405, system control module 410 coupled to at least one of the processor(s) 405, system memory 415 coupled to system control module 410, non-volatile memory (NVM)/storage 420 coupled to system control module 410, and one or more communications interface(s) 425 coupled to system control module 410.

In some embodiments, the system 400 may be capable of functioning as the UE 110 as described herein. In other embodiments, the system 400 may be capable of functioning as the base station 105 depicted in the embodiment shown in FIG. 1 or any one of the other described embodiments. In other embodiments, the system 400 may be capable of functioning as the ANDSF server 315. In some embodiments, the system 400 may include one or more computer-readable media (e.g., system memory or NVM/storage 420) having instructions and one or more processors (e.g., processor(s) 405) coupled with the one or more computer-readable media and configured to execute the instructions to implement a module to perform actions described herein.

System control module 410 for one embodiment may include any suitable interface controllers to provide for any suitable interface to at least one of the processor(s) 405 and/or to any suitable device or component in communication with system control module 410.

System control module 410 may include memory controller module 430 to provide an interface to system memory 415. The memory controller module 430 may be a hardware module, a software module, and/or a firmware module.

System memory 415 may be used to load and store data and/or instructions, for example, for system 400. System memory 415 for one embodiment may include any suitable volatile memory, such as suitable DRAM, for example. In some embodiments, the system memory 415 may include double data rate type four synchronous dynamic random-access memory (DDR4 SDRAM).

System control module 410 for one embodiment may include one or more input/output (I/O) controller(s) to provide an interface to NVM/storage 420 and communications interface(s) 425.

The NVM/storage 420 may be used to store data and/or instructions, for example. NVM/storage 420 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 420 may include a storage resource physically part of a device on which the system 400 is installed or it may be accessible by, but not necessarily a part of, the device. For example, the NVM/storage 420 may be accessed over a network via the communications interface(s) 425.

Communications interface(s) 425 may provide an interface for system 400 to communicate over one or more network(s) and/or with any other suitable device. The system 400 may wirelessly communicate with the one or more components of the wireless network in accordance with any of one or more wireless network standards and/or protocols.

For one embodiment, at least one of the processor(s) 405 may be packaged together with logic for one or more controller(s) of system control module 410, e.g., memory controller module 430. For one embodiment, at least one of the processor(s) 405 may be packaged together with logic for one or more controllers of system control module 410 to form a System in Package (SiP). For one embodiment, at least one of the processor(s) 405 may be integrated on the same die with logic for one or more controller(s) of system control module 410. For one embodiment, at least one of the processor(s) 405 may be integrated on the same die with logic for one or more controller(s) of system control module 410 to form a System on Chip (SoC).

In various embodiments, the system 400 may be, but is not limited to, a server, a workstation, a desktop computing device, or a mobile computing device (e.g., a laptop computing device, a handheld computing device, a tablet, a netbook, etc.). In various embodiments, the system 400 may have more or less components, and/or different architectures. For example, in some embodiments, the system 400 includes one or more of a camera, a keyboard, liquid crystal display (LCD)

screen (including touch screen displays), non-volatile memory port, multiple antennas, graphics chip, application-specific integrated circuit (ASIC), and speakers.

Embodiments may provide methods, systems or apparatuses, for connecting to an AP in a WLAN by a UE. The connecting may include receiving from the AP one or more selection policy parameters of the WLAN including a realm, and also receiving from an entity of a 3GPP network one or more selection policy parameters of the 3GPP network. The one or more selection policy parameters of the WLAN may be compared to the one or more selection policy parameters of the 3GPP network. A network list may be created based at least in part on the comparison, and the UE may associate with the AP based on the network list.

In some embodiments, the realm may be an NAI realm, and the selection policy parameters may include roaming consortium data or OUI data of the respective WLAN or 3GPP network. Additionally, the network list may be prioritized based at least in part on the comparison. The entity of the 3GPP network may be an ANDSF entity or an I-WLAN IWK MO.

In certain embodiments, the connecting may further include transmitting a query comprising at least one of the one or more selection policy parameters of the WLAN and receiving the one or more selection policy parameters of the 3GPP network in response to the query. In other embodiments, the connecting may further include identifying an identifier of the AP, transmitting a query which may be an ANQP GAS query, and receiving the one or more selection policy parameters of the WLAN from the AP in response to the query.

Some embodiments may be stored as instructions on a computer readable media, and the instructions, when executed by a processor of a 3GPP UE, cause the 3GPP UE to receive network selection policy parameters of first and second WLAN APs, and also receive network selection policy parameters of a 3GPP home network of the UE. The instructions may then cause the 3GPP UE to compare the received network selection policy parameters and construct a network list based on the comparison wherein the first WLAN AP has a higher priority on the network list than the second WLAN AP.

Further embodiments may include a WLAN AP with memory configured to store an SSID of the WLAN, and further configured to store network selection policy parameters for a roaming agreement of the WLAN NSP with a 3GPP network operator. In some embodiments, the network selection policy parameters may include a realm of the WLAN. The AP may further include a transmitter configured to transmit the network selection policy parameters to a 3GPP UE in response to a query from the UE comprising the SSID. Further, the AP may include a receiver configured to receive an access request from the UE to join the WLAN from the 3GPP network in response to comparison of the network selection policy parameters with 3GPP network selection policy parameters. In some embodiments, the WLAN NSP and the 3GPP network operator may have a direct or indirect roaming agreement.

Other embodiments may include a method by a 3GPP network operator comprising creating a roaming relationship with a WLAN NSP. The 3GPP network operator may then receive a request from a UE on the 3GPP network for network selection policy parameters comprising NAI realm data and one or more of roaming consortium data and OUI data related to the roaming relationship. The 3GPP network operator may then transmit the network selection policy parameters to the UE. In some embodiments, the network selection policy parameters may be transmitted by a 3GPP ANDSF. In some embodiments, the network selection policy parameters may define a priority for the WLAN NSP based on the roaming relationship. For example, the WLAN NSP may have a highest priority if it has a direct roaming relationship with the 3GPP network operator. Alternatively, the WLAN NSP may have a moderate priority if it has an indirect roaming relationship with the 3GPP network operator. In other embodiments, the WLAN NSP may have a lowest priority if it has no roaming relationship with the 3GPP network operator.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such element. Further, ordinal indicators (e.g., first, second or third) for identified elements are used to distinguish between the element, and do not indicate or imply a required or limited number of such elements, nor do they indicate a particular position or order of such elements unless otherwise specifically stated.

What is claimed is:

1. One or more non-transitory computer-readable media comprising instructions to cause a user equipment (UE), when executed by one or more processors of the UE, to:

compare a network access identifier (NAI) realm received from an access point (AP) of a wireless local access network (WLAN) to one or more selection policy parameters of a third generation partnership project (3GPP) network, wherein the NAI realm identifies the WLAN as associated with a service provider of the 3GPP network; and associate with the AP based on the comparison.

2. The one or more non-transitory computer-readable media of claim 1, wherein the instructions are further to cause the UE to associate with the AP based on a comparison of WLAN roaming consortium data or an organizationally unique identifier (OUI) of the WLAN with the one or more selection policy parameters.

3. The one or more non-transitory computer-readable media of claim 1, wherein the one or more selection policy parameters of the 3GPP network are 3GPP network roaming consortium data or organizationally unique identifier (OUI) data of the 3GPP network.

4. The one or more non-transitory computer-readable media of claim 1, wherein the instructions are further to cause the UE to generate a prioritized network list based at least in part on the comparison of the NAI realm to the one or more selection policy parameters of the 3GPP network.

5. The one or more non-transitory computer-readable media of claim 1, wherein the instructions are further to cause the UE to receive the one or more selection policy parameters from a 3GPP Access Network Discovery and Selection Function (ANDSF) entity or an interworking wireless local area network interworking mobile object (I-WLAN IWK MO).

6. The one or more non-transitory computer-readable media of claim 1, wherein the instructions are further to cause the UE to:

transmit a query comprising the NAI realm; and receive the one or more selection policy parameters of the 3GPP network in response to the query.

7. The one or more non-transitory computer-readable media of claim 1, wherein the instructions are further to cause the UE to:

identify an identifier of the AP;
transmit a query that includes the identifier to the AP; and
receive, responsive to the query that includes the identifier, an indication of the NAI realm from the AP.

8. The one or more non-transitory computer-readable media of claim 1, wherein the query that includes the identifier is an Access Network Query Protocol (ANQP) Generic Advertisement Service (GAS) query.

9. A user equipment (UE) comprising:
a transceiver to communicate with an access point (AP) of a wireless local access network (WLAN) and communicate with an entity of a third generation partnership project (3GPP) network; and
a processor coupled with the transceiver, the processor to:
compare a network access identifier (NAI) realm received from the AP to one or more selection policy parameters of the 3GPP network, wherein the NAI realm identifies the WLAN as associated with a service provider of the 3GPP network; and
associate with the AP based on the comparison.

10. The UE of claim 9, wherein the processor is further to associate with the AP based on a comparison of WLAN roaming consortium data or an organizationally unique identifier (OUI) of the WLAN with the one or more selection policy parameters.

11. The UE of claim 9, wherein the one or more selection policy parameters of the 3GPP network are 3GPP network roaming consortium data or organizationally unique identifier (OUI) data of the 3GPP network.

12. The UE of claim 9, wherein the processor is further to generate a prioritized network list based at least in part on the comparison of the NAI realm to the one or more selection policy parameters of the 3GPP network.

13. The UE of claim 9, wherein the transceiver is further to receive the one or more selection policy parameters from a 3GPP Access Network Discovery and Selection Function (ANDSF) entity or an interworking wireless local area network interworking mobile object (I-WLAN IWK MO).

14. The UE of claim 9, wherein the transceiver if further to:
transmit a query comprising the NAI realm; and
receive the one or more selection policy parameters of the 3GPP network in response to the query.

15. The UE of claim 9, where the processor is further to identify an identifier of the AP, and the transceiver is further to;
transmit a query that includes the identifier to the AP; and
receive, responsive to the query that includes the identifier, an indication of the NAI realm from the AP.

16. The UE of claim 9, wherein the query that includes the identifier is an Access Network Query Protocol (ANQP) Generic Advertisement Service (GAS) query.

17. An access point (AP) of a wireless local access network (WLAN) comprising:
a transmitter to transmit, to a user equipment (UE), an indication of a network access identifier (NAI) realm, wherein the NAI realm identifies the WLAN as associated with a service provider of the 3GPP network; and
a receiver coupled with the transmitter, the receiver to receive, from the UE based on a comparison of the NAI realm to one or more selection policy parameters of the 3GPP network, an indication of an association of the UE with the AP.

18. The AP of claim 17, wherein the receiver is further to receive, from the UE, an Access Network Query Protocol (ANQP) Generic Advertisement Service (GAS) query that includes an identifier of the AP; and
the transmitter is to transmit the indication of the NAI realm based on the ANQP GAS query.

19. The AP of claim 17, wherein the indication of the association is further based on a comparison of WLAN roaming consortium data or an organizationally unique identifier (OUI) of the WLAN with the one or more selection policy parameters.

20. The AP of claim 17, wherein the one or more selection policy parameters of the 3GPP network are 3GPP network roaming consortium data or organizationally unique identifier (OUI) data of the 3GPP network.

* * * * *